INVENTORS.
Fred F. Johnson
Richard Earl Rutledge, Sr.
Frank J. Thomas
BY
Scofield, Kokjer, Scofield & Lowe
ATTORNEYS.

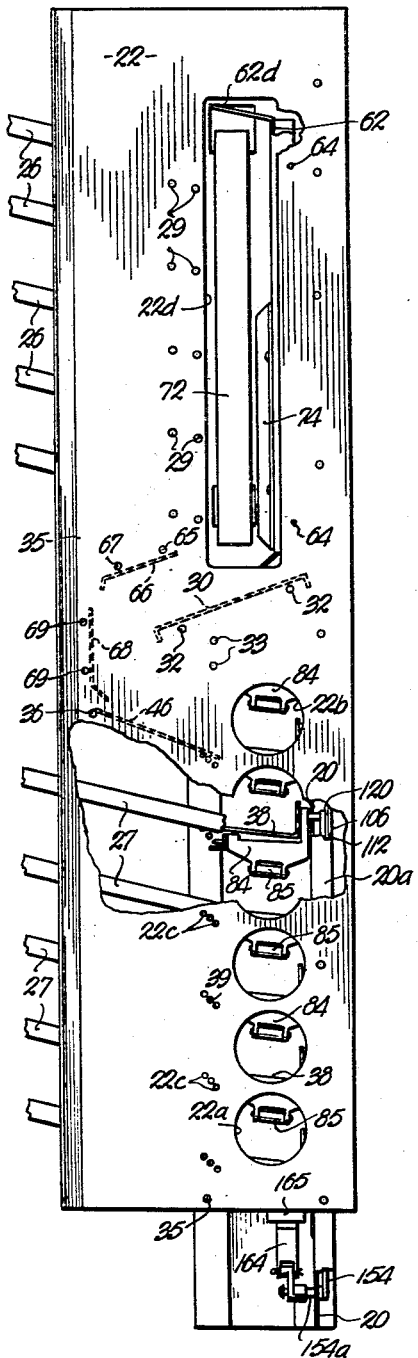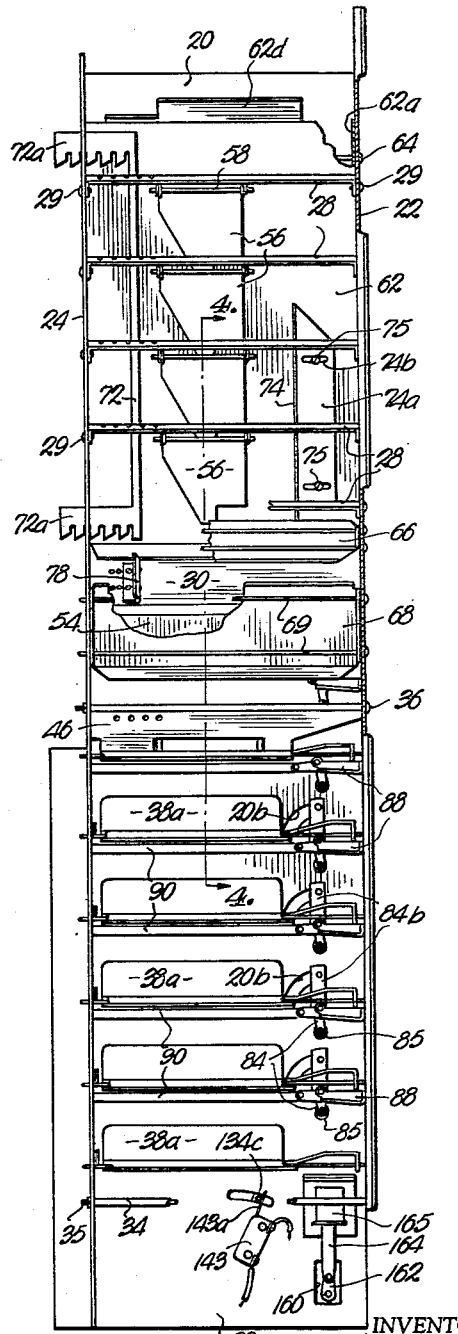

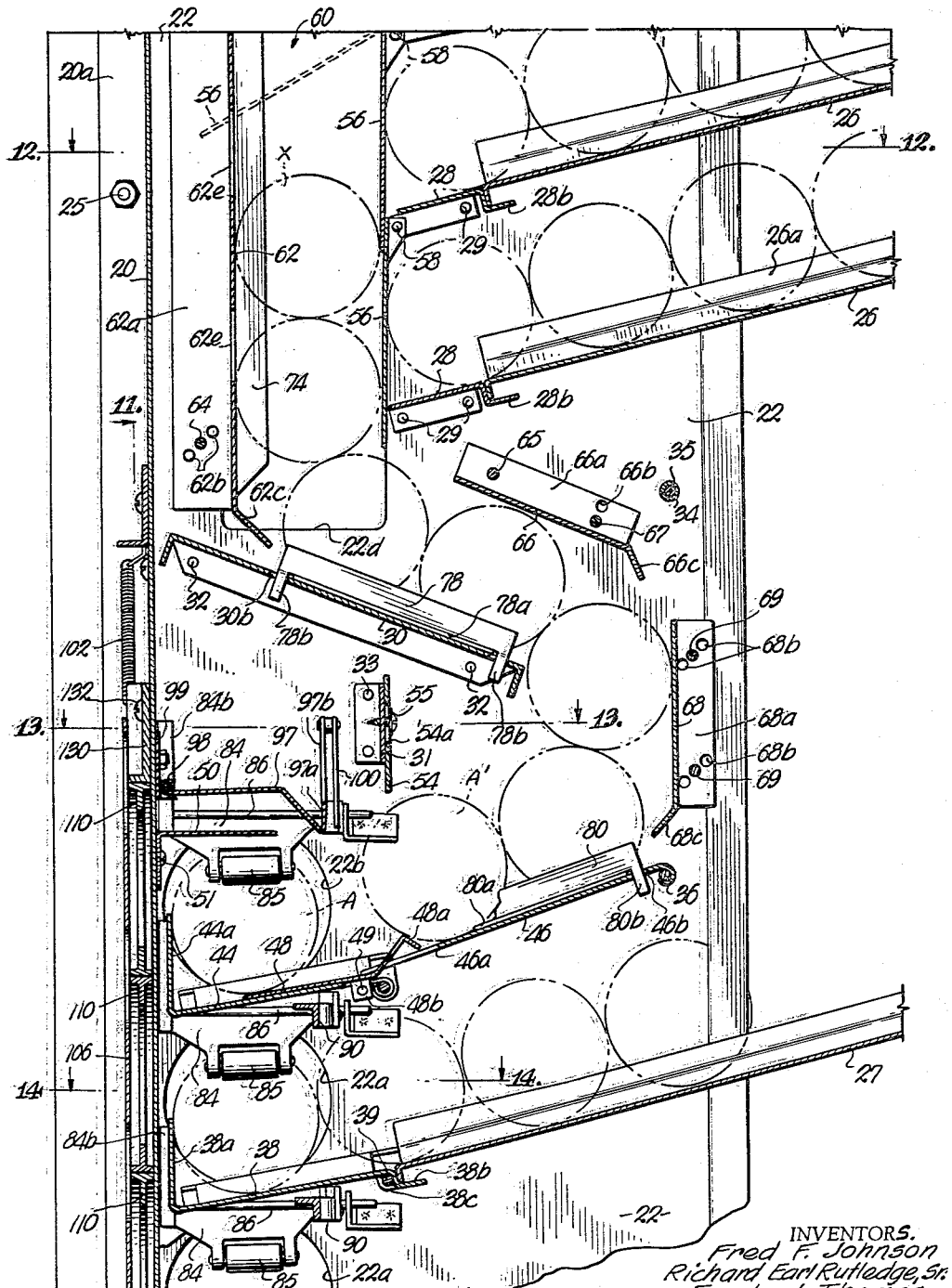

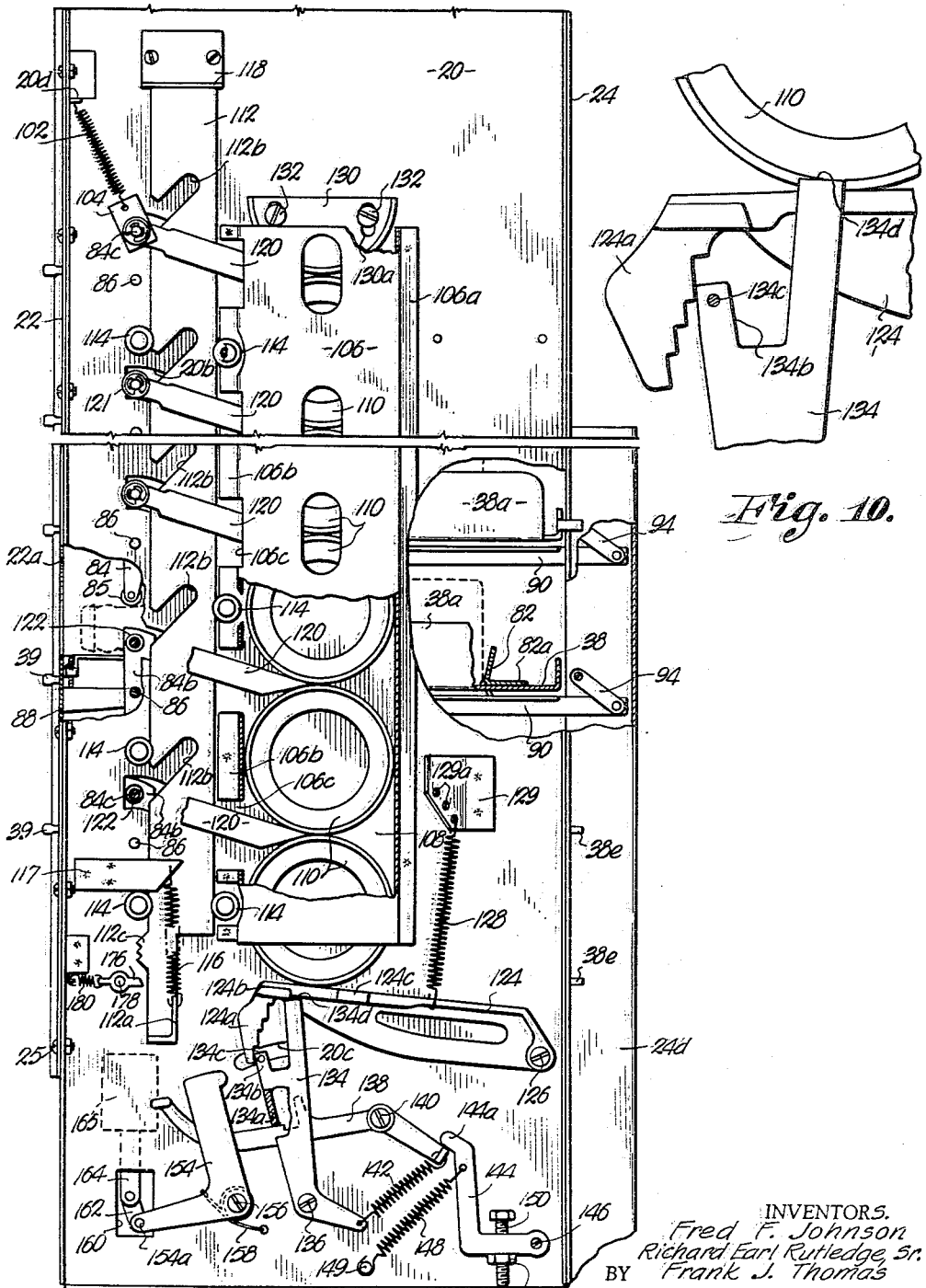

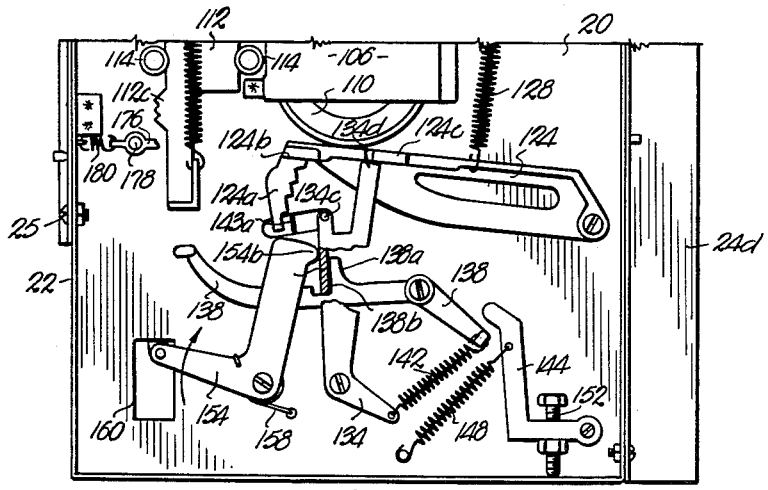

INVENTORS.
Fred F. Johnson
Richard Earl Rutledge, Sr.
Frank J. Thomas
BY Scofield, Kokjer, Scofield & Lowe
ATTORNEYS.

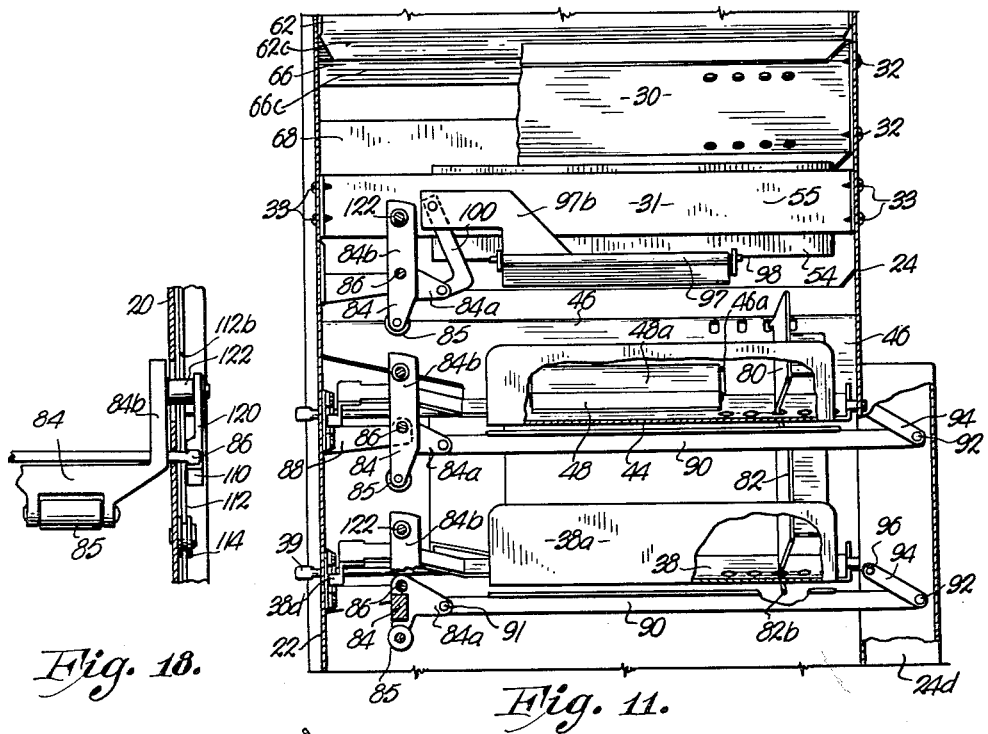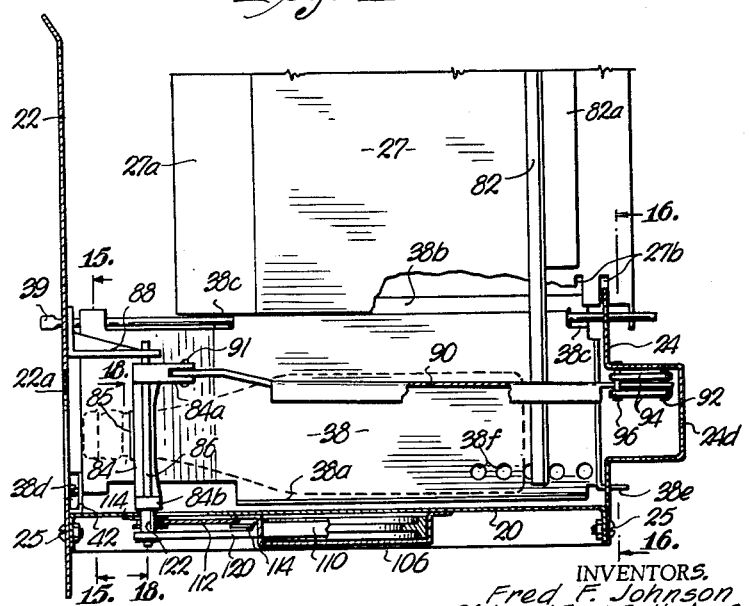

United States Patent Office 3,169,621
Patented Feb. 16, 1965

3,169,621
SELECTIVE BOTTLE VENDING MACHINE
Fred F. Johnson and Richard Earl Rutledge, Sr., Kansas City, Mo., and Frank J. Thomas, Overland Park, Kans., assignors to Selectivend Corporation, a corporation of Missouri
Filed Feb. 23, 1962, Ser. No. 174,959
20 Claims. (Cl. 194—2)

The present invention relates in general to coin-operated vending machines of the type wherein the articles to be vended are arranged in groups according to flavor, brand, size, shape or some other characteristic; and it deals more particularly with selective vending machines having mechanism normally locking the articles against removal but which, during each cycle of operation of the machine, permits manual withdrawal of one—but only one—article from any selected group.

An object of the invention is to provide an improved mechanism controlled by the partial withdrawal of an article from any selected group during a cycle of operation of the machine to automatically lock out the remaining groups so as to prevent a customer from removing more than one article for each vending fee deposited.

An important feature of the invention resides in the novel character and arrangement of said mechanism, whereby every type of customer manipulation aimed at obtaining one or more articles from the machine without proper payment therefor is reliably guarded against.

Another object of the invention is to make it easier than heretofore has been the case to withdraw an article from a selective vending machine having an automatic lockout mechanism of the foregoing character, so that less customer effort is required.

According to the invention one article of each group is normally disposed in a vending position or station and, upon withdrawal therefrom, serves to engage a gate normally blocking its path and displace same from closed to open position; a salient feature of the invention is to provide lockout mechanism having spring means for automatically restoring the displaced gate to closed position immediately following withdrawal of an article, yet without causing said gate, during the antecedent removal of the article, to offer substantial resistance to such removal.

Another object of the invention is to provide a coin operated selective vending machine of the type indicated above, which, after the deposit of the required vending fee, will automatically reject any further deposit of coins until the article already paid for has been withdrawn from the machine.

The vending machine of the present invention is particularly adapted to handle bottled beverages arranged in groups according to the beverage flavor or brand, one of the groups comprising a substantially larger number of bottles than the others in order to accommodate a greater customer demand for a particular flavor or brand of beverage. The bottles are arranged on inclined shelves, a single shelf being allocated to each of the smaller groups and each such shelf having at its lower end a vending station toward which the bottles advance by rolling as one bottle after another is withdrawn from the vending station on successive vending cycles.

According to the invention, a single similar vending station is provided for the aforementioned larger group of bottles, and the lockout mechanism common to the vending stations for the smaller groups is also common to that for the larger group. A larger storage magazine is provided for the last mentioned group, and a feature of the invention is the construction and arrangement by which the bottles are fed by gravity from said magazine to the vending station for the larger group. A further feature resides in the adjustment provisions made for handling bottles of different size and shape in said magazine and feeding system.

Still another feature of the invention resides in the provision of structure for reducing or eliminating frictional engagement between a bottle being withdrawn from a vending station and the bottles waiting next to be vended from that station, thereby to reduce the customer effort required for such withdrawal.

Yet another feature of the invention resides in the novel construction of means for preventing a second bottle from advancing into a vacant vending station after removal of a first bottle therefrom, until such time as said station is locked against withdrawal of the second bottle.

Other and further objects of the invention together with additional features of novelty whereby the objects are achieved, will appear in the course of the following description.

In the accompanying drawings, which form a part of the present specification and are to be read in conjunction therewith, and in which like reference numerals are employed to indicate like parts in the various views;

FIG. 1 is a front elevational view of a bottle vending machine embodying the present invention, parts being broken away for purposes of illustration;

FIG. 3 is a side elevational view of the vending machine with the bottle storage shelves removed and with parts broken away for purposes of illustration;

FIG. 4 is an enlarged cross-sectional view taken along the line 4—4 of FIG. 3 in the direction of the arrows;

FIG. 5 is an enlarged side elevational view of the machine showing the side opposite that illustrated in FIG. 3 parts being broken away for the sake of clarity;

FIGS. 6, 7, 8 and 9 are views similar to that contained in the lower portion of FIG. 5, but showing the mechanism in different stages of a vending operation;

FIG. 10 is an enlarged fragmentary view of a portion of the mechanism illustrated in FIGS. 5–9;

FIG. 11 is a sectional view taken along the line 11—11 of FIG. 4 in the direction of the arrows, parts being broken away for purposes of illustration;

FIG. 14 is a cross-sectional view taken along the line 14—14 of FIG. 4 in the direction of the arrows;

FIG. 18 is an enlarged cross-sectional view taken approximately along the line 18—18 of FIG. 14 in the direction of the arrows; and FIG. 19 is a simplified circuit diagram of the control circuits for the vending machine.

Figure 4A:
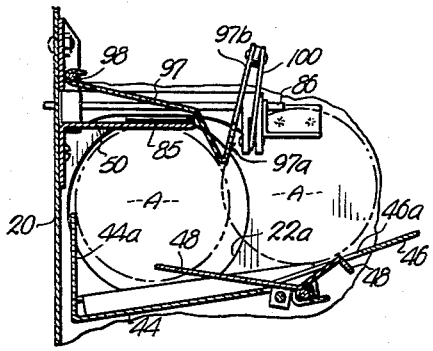
FIG. 4a is an enlarged sectional view of the uppermost vending station shown in FIG. 4, but showing the position of the parts during a vending operation.

Referring more particularly to the drawings, the bottle vending machine illustrated therein has a rigid frame including a vertically elongated generally rectangular side panel 20 with narrow longitudinal flanges 20a extending the length of its front and rear edges. A front panel 22 and a rear panel 24 are secured to these flanges by bolts 25 to form with the side panel 20 an upright, three sided enclosure which is generally open on the fourth side to receive an upper group of removable shelves 26 and a lower group of removable shelves 27. These shelves slope downwardly toward the enclosure, as shown.

Vertically spaced shelf supports 28 are provided for the upper shelves 26. Each support bridges the space between the front and rear panels and has flanged ends to which the respective panels are secured by screws or bolts 29, whereby said supports also act as cross braces between the two panels, giving the upper section of the framework added rigidity.

The midsection likewise is braced and reinforced by cross members 30 and 31, each of which has its ends secured by screws or bolts 32, 33 to the front and rear panels. Also, in the lower and midportions of the frame, the front and rear panels are clamped against the ends of elongated spacer sleeves 34 by means of tie bolts 35 extending through the sleeves. It will be understood that all of the aforementioned bracing and spacing members are part of the permanent rigid framework of the unit.

The shelves in the lower group, i.e., shelves 27, are associated respectively with a series of vertically spaced bottle discharge ports 22a (FIG. 1) in the front panel of the frame. Above ports 22a is a single additional discharge port 22b for bottles carried on upper shelves 26. It is through ports 22a and 22b that customers can withdraw bottles from the machine when the proper conditions for vending have been satisfied as described hereinafter. In use, then, it will be understood that customers have access only to these circular discharge ports, the balance of the machine, as well as the bottle storage shelves 26, 27 being covered and enclosed in a suitable cabinet (not shown) whose interior preferably is refrigerated in the manner which is conventional with machines for vending bottled soft drinks. The brackets 37 that support the upper ends of the respective bottle storage shelves (FIG. 12) conveniently can be mounted on an interior wall of this cabinet.

*Adjustable vending stations for lower shelves 27*

Behind each port 22a there is a bottle platform or tray 38 (FIG. 14) which slopes downwardly toward the side wall 20 (FIG. 4) but which has along one edge an upturned flange 38a, the platform and flange being designed to support a bottle horizontally in proper alignment with the associated port 22a for withdrawal therethrough. A bottle thus supported on the platform will be referred to hereinafter as being in the vending station or position. Along the other edge of each platform 38, there is an offset ledge 38b for supporting the lowermost end of one of the inclined storage shelves 27 as best seen in FIG. 4.

In use, bottles are laid horizontally in side-by-side position on each of the storage shelves 27, with the bottle crown toward opening 22a so they tend to roll down same toward the vending station behind the associated port 22a in the front panel. Consequently when one bottle is withdrawn horizontally through the port from the vending station, the next bottle will roll into place on the tray in readiness for the next vending operation, all as will be described more fully hereinafter.

One edge of each tray 38 is supported by an elongated rod 39 which is threaded through loops or eyes formed by the bent portions 38c of the tray at opposite ends of ledge 38b. Rod 39 spans the space between the front and rear panels 22 and 24, being removably inserted in a selected one of three spaced holes 22c in the front panel, and in an aligned one of three corresponding holes 24c in the rear panel. The three holes of each set are arranged diagonally, so that the edge of the tray which is carried by rod 39 can be positioned higher or lower (as well as adjusted laterally) by proper selection of the holes 22c and 24c employed to support the ends of rod 39.

The opposite edge of each tray 38 is supported by lugs 38d and 38e projecting forwardly and rearwardly from the tray (FIG. 14). The rearwardly projecting lug 38e is received in an aperture 24b in the rear panel 24, the lower portion of this aperture having a stair-step configuration as best seen in FIG. 16. The forwardly projecting lug 38d is received in a similarly shaped aperture in bracket 42 (FIG. 15) which is spot welded or otherwise suitably secured to the front panel 22.

Figure 15:
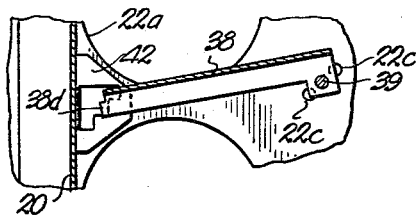
FIG. 15 is a sectional view taken along the line 15—15 of FIG. 14 in the direction of the arrows.
Figure 16:
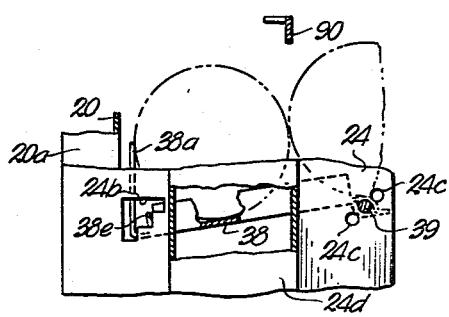
FIG. 16 is a fragmentary sectional elevation taken approximately along the line 16—16 of FIG. 14 in the direction of the arrows.

Thus, as will be appreciated from FIGS. 15 and 16, when the higher edge of tray 38 is adjusted in position by withdrawing rod 39 and shifting it to higher or lower ones of the holes 22c, 24c, the opposite edge of the tray is adjusted similarly at the same time, by shifting lugs 38d, 38e to higher or lower steps in the supporting aperture. Stated differently, the steps on which lugs 38d and 38e rest is always determined by the adjusted position of rod 39. Accordingly any adjustment of the position of the tray 38 results in its being displaced bodily upwardly and laterally (or downwardly and laterally) from the position shown in FIGS. 15 and 16, the bottom of the tray always being essentially parallel to the position illustrated.

This adjustment permits handling bottles of different diameter at any vending station. Generally speaking, an upward adjustment of the tray is made when smaller bottles are to be handled, while the adjustment is downward for handling bottles of larger diameter. Such adjustment is, of course, accompanied by a lateral translation or shift of the flange 38a which extends upwardly from the edge of the tray, the direction of this shift being such that the vertical center line of the bottle in the vending station (see FIG. 4) will approximately coincide with the vertical center line of the associated discharge port 22a. Also, it will be understood from the latter figure that any adjustment of the tray 38 results in a very slight change in the position of the lower end of the associated storage shelf 27, since this is supported on ledge 38b of the tray.

*Vending station for upper bottle-storage magazine*

Figure 13:
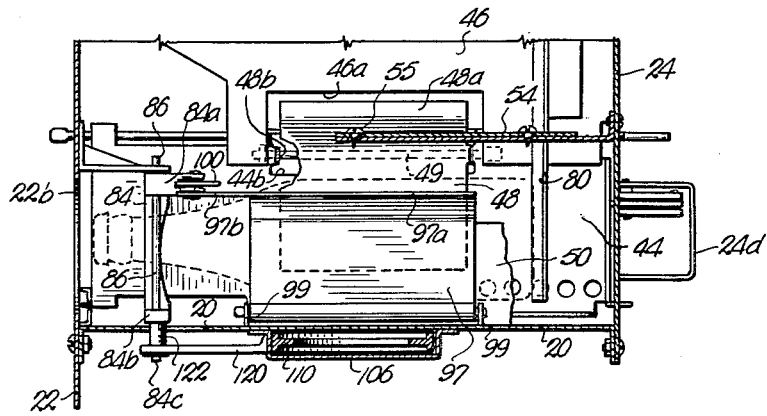
FIG. 13 is a sectional view taken along the line 13—13 of FIG. 4 in the direction of the arrows.

The tray or platform 44 positioned behind the uppermost bottle discharge port 22b is adjustably supported in exactly the same way as just described, so it will not be necessary to repeat the description with respect thereto. However, this tray differs in several other respects from the remaining trays in the machine. To begin with, while it resembles the other trays in that it has an upstanding flange 44a along one edge for vertically centering the bottle in the vending station behind port 22b, it has no shelf-supporting ledge along the opposite edge. Instead, there is associated with tray 44 an inclined flat chute 46 supported at its upper end by the cross rod or tie bolt 36 (FIG. 4) while its lower end simply rests on tray 44 as best seen in FIG. 13. As will also be seen from the latter figure, the lower end of the chute is bifurcated, that is to say it is cut out to provide an intermediate opening 46a with portions on either side thereof straddling a treadle or gate 48.

The bottom of tray 44 also has a cut-out generally rectangular opening 44b under this treadle. Integral lugs extending downwardly from the tray at opposite ends of opening 44b serve to support a hinge pin 49, and treadle 48 has downturned apertured lugs 48b by means of which it is hinged to rock on this pin.

Normally the main body of treadle 48 lays flat on the bottom of tray 44, held down by the weight of a bottle A in the vending station (see FIG. 4). Spaced very slightly above the latter bottle is a horizontal plate 50. This plate is provided with a depending flange along one edge and is secured to the side panel 20 of the frame by means of screws or bolts 51 extending through vertically elongated holes in the flange. By loosening these screws, plate 50 thus can be adjusted upwardly if the diameter of bottle A is large or downwardly if the diameter is small, it being understood that the adjustment always is such that there will be only a predetermined small clearance between plate 50 and the top of a bottle positioned in the vending station.

Treadle 48 upon which bottle A rests also has an integral upturned flanged portion which forms a stop 48a designed to prevent other bottles from rolling down chute 46 toward the vending station until such time as bottle A has been pulled through port 22b far enough to clear the treadle.

Now, a bottle A' whose advance down chute 46 has been arrested by stop 48a naturally has considerable thrust exerted on it from behind by the bottles following it, and consequently it tends to depress the stop. In the event that the weight of the bottle A in vending station is not sufficient to resist this tendency, plate 50, by limiting the amount that bottle A can be elevated by treadle 48, insures that stop 48a will be depressed very little if at all by bottle A'.

As a further safeguard, a barrier 54 is provided above stop 48a to insure that bottle A' cannot pass by riding up over the stop. Barrier 54 is a plate which is secured to the fixed frame member 31 by means of screws 55 extending through vertically elongated holes 54a in the plate. By loosening these screws, barrier 54 can be adjusted upwardly or downwardly to suit the diameter of the bottles being handled; its position should, of course, be such as to permit bottles to pass freely under the barrier when stop 48a is depressed flush with chute 46 (FIG. 4a) while preventing such passage when the stop is elevated above the level of the chute in the manner illustrated in FIG. 4.

*Upper storage magazine and bottle-feeding arrangement*

As will presently be seen, whenever a bottle such as A is withdrawn from the machine by being pulled through the uppermost port 22b it is replaced by another bottle rolling into the vending station behind said port, so as to be ready for the next vending operation. This will continue so long as there are bottles in any portion of the machine above the level of port 22b, and it will be convenient now to consider the path by which such bottles reach the vending station A.

Figure 12:
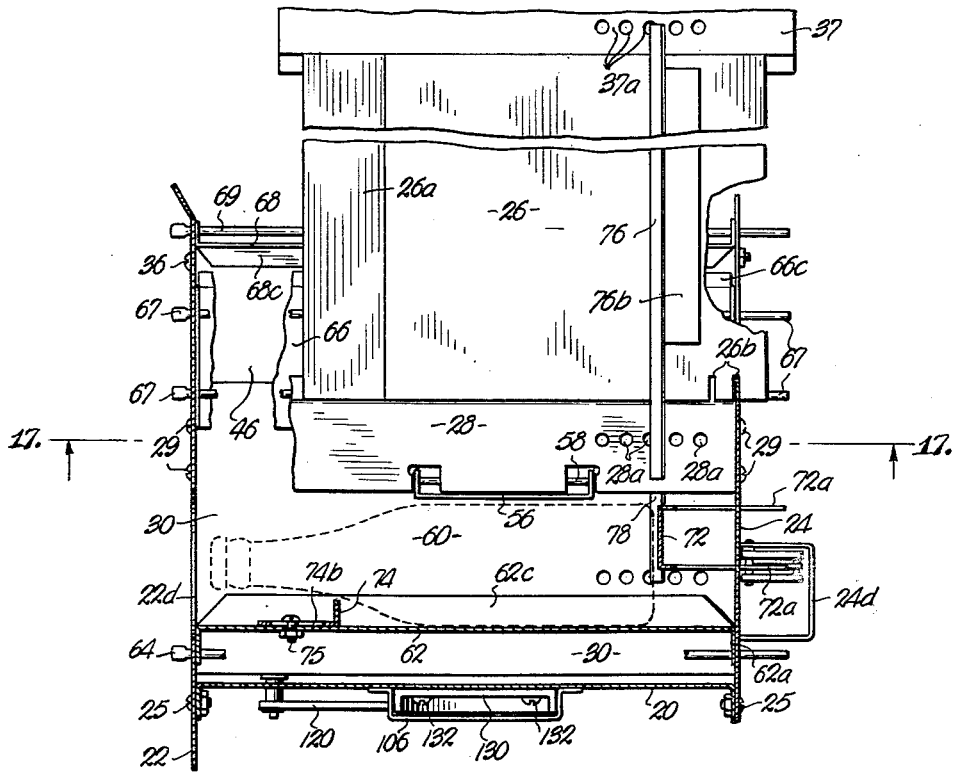
FIG. 12 is a sectional view taken along the line 12—12 of FIG. 4 in the direction of the arrows with parts broken away for clarity.

Referring to FIGS. 3, 4 and 12, each of the shelf supports 28 except the lowermost one carries a depending gate 56 which swingably hangs from a hinge pin 58 mounted on the underside of the shelf support adjacent to one edge thereof. When hanging vertically (FIG. 4) the bottom of each gate overlaps the top of the one immediately below it, and together these gates form one wall of a bottle column or passageway 60.

The opposite wall of the column comprises an upright flat panel 62 which is positioned between the front and rear walls (22, 24) of the machine so as to be parallel to, but spaced laterally from, the side wall 20.

Associated with the lower end of the vertical bottle column or passageway 60 is a further passageway defined by guides 66 and 68 as well as the sloping chutes 30 and 46, previously referred to; accordingly as will be clear from FIG. 4, bottles reaching the bottom of passageway 60 are diverted laterally and downwardly, rolling along chute 30 and under the generally parallel guide 66 until they can descend onto chute 46 through the throat between the lowermost end of chute 30 and the laterally spaced guide 68.

Guides 66 and 68 are generally flat plates spanning the space between the front and rear walls 22 and 24 and having apertured mounting flanges 66a, 68a adjacent to the respective walls. A pair of removable rods 69 received in aligned holes in the front and rear walls of the machine extend through selected ones of the apertures 68b in the flanges of the vertical guide plate 68 to support the plate; as will be noted from FIG. 4, there are three such apertures for each rod, permitting the plate to be mounted so as to be nearer to, or farther from, the lowermost edge of chute 60, thereby to adjust the width of the throat between the two.

A pair of rods 65 and 67 extending through aligned holes in the front and rear walls 22, 24 of the machine are employed to support guide plate 66. Each flange 66a of this plate has a single hole for receiving rod 65, whereas rod 67 is removably received in a selected one of two holes 66b of the flange. When the latter rod is withdrawn, plate 66 can swing upwardly or downwardly about rod 65, permitting adjustment of the bottom edge of this plate to a higher or lower position; in practice rod 67 is inserted in the top hole 66b (so that the plate is in the lower of its two positions) only when the vertical plate 68 is adjusted so as to be closest to the bottom edge of guide 30, that is to say only when rods 69 are inserted in the top holes 68b of each three-hole group.

The mounting arrangement for the side panel 62 of column 60 is essentially like that described in connection with guide plate 68. More specifically, a pair of removable rods 64 received in aligned holes in the front and rear walls 22, 24 of the machine extend through selected ones of the apertures 62b in the vertical flanges 62a of panel 62, there being three such apertures for each rod, whereby the panel can be mounted closer to, or farther from, the gates 56 which form the opposite side of column 60.

As will readily be understood, the aforementioned adjustments make it possible to vary the width of bottle column 60 to suit the diameter of the bottles which must pass therethrough, any change in width being accompanied by a corresponding adjustment of guides 66 and 68 to suit the bottle diameter.

Referring to FIG. 12, bottles in column 60 are positioned substantially as illustrated by dotted lines. In addition to being confined on opposite sides by wall 62 and gates 56, respectively, it will be noted that each bottle has its base adjacent to a vertical guide 72 which serves to prevent it from moving axially toward the rear of the machine. Channel-shaped in transverse cross section, this guide extends virtually the full length of column 60 from top to bottom, and has at its ends notched hangers 72a which extend through openings 24a in the rear panel. By lifting it slightly to disengage the notched bottoms of the hangers from their resting place on the lower edges of the respective openings 24a, guide 72 can be shifted forwardly or rearwardly relative to the rear panel 24 and allowed to reseat in a different set of notches. In practice, it is adjusted in this fashion according to the length of the bottles to be handled, its adjusted position being such that the capped small end of said bottles will be only a small distance behind the front panel 22 as shown in FIG. 12.

A further vertical guide 74 tends to restrain bottles from shifting axially forward and to resist "nose diving" of said bottles as they descend in column 60. This guide is in the nature of a rib projecting from side panel 62 in the region where the bottles increase in diameter (see FIG. 12) and it is adjustable forwardly or rearwardly in accordance with the bottle silhouette so that its edge will be engaged by a bottle which tends to shift or pitch forwardly. Guide 74 has a mounting flange 74a containing horizontally elongated slots 74b, and it is secured to panel 62 by means of suitable screws or bolts 75 extending through the slots. To effect the aforementioned adjustment it is only necessary, of course, to temporarily loosen these fastening bolts.

Figure 17:
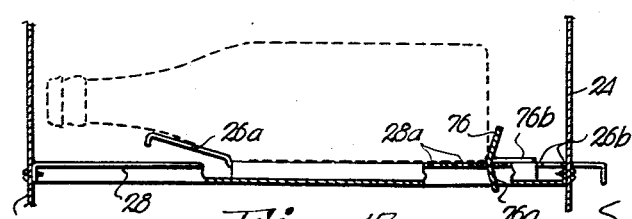
FIG. 17 is a cross-sectional view taken along the line 17—17 of FIG. 12 in the direction of the arrows.
Figure 2:
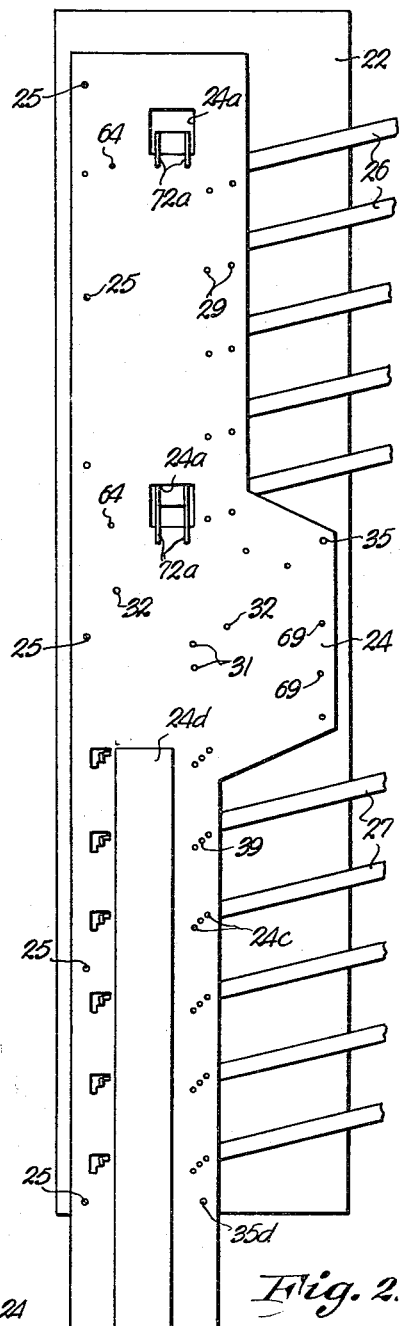
FIG. 2 is a rear elevational view of same.

In the use of the machine, bottles are laid side by side on each of the inclined shelves 26 (FIG. 4), so that the main body portion of each bottle, i.e., the portion of largest diameter, is cradled between a ledge 26a and a gauge bar or guide 76 as shown in FIG. 17. Sloping in transverse cross section, ledge 26a extends lengthwise of the shelf along its forward edge and forms a support for the tapering neck portion of the bottles as they roll down the shelf toward column 60. Gauge bar 76 is slightly longer than the associated shelf and overlaps the shelf supports 28 and 37 at the ends thereof; close to its ends it has downwardly projecting integral lugs 76a which are removably received in matching positioning holes 28a and 37a of the respective shelf supports so that the bar extends longitudinally of the shelf, parallel to ledge 26a. Intermediate its ends, the bar has a flange 76b that rests on the shelf and serves to support bar 76 in a generally upright, but slightly tilted, position when viewed in cross section.

With gauge bar 76 removed, its associated shelf 26 can also be removed from supports 28 and 37, as previously suggested. At its lower end, the shelf has a pair of slots 26b (FIG. 12) either of which can be made to register with and receive the edge of rear panel 24 when the shelf is replaced on its supports. Depending upon which slot is employed, the shelf either occupies a forward position, as shown, or an alternate position spaced rearwardly by an amount equal to the distance between slots 26b. By this forward or rearward adjustment, ledge 26a can be made to function properly as a rest for the tapered portion of bottles of different contour (FIG. 17).

Gauge bar 76 also can be adjusted forwardly or rearwardly in position by selection of the holes 28a and 37a in which its two positioning lugs 76a are inserted. In practice it is located so that a bottle rolling down shelf 26 with its base in engagement with bar 76 will enter column 60 just forward of the vertical guide 72 (FIG. 12).

Removable gauge bars 78 and 80 are provided on chutes 30 and 46, respectively, to keep bottles traveling down these chutes from moving rearwardly and thus insuring that each bottle entering the vending station A will have its capped small end close to the plane of the front panel 22 of the machine. Although shorter in length, gauge bars 78 and 80 are similar to gauge bars 76 as regards construction, mounting arrangement and adjustability. Thus, as will be seen from FIGS. 3 and 4 bar 78 is in the nature of an inclined rib having at the bottom a flange 78a which rests on chute 30; integral lugs 78b extend downwardly through positioning holes 30b in the shelf, a horizontal row of such holes being provided to permit adjustment of the gauge bar 78 nearer to, or farther from, the rear panel of the machine. In like fashion, gauge bar 80 is supported by a base flange 80a resting on chute 46 and has downwardly extending integral lugs 80b which are received in selected ones of the positioning holes 46b. When the machine is set up to handle a given size and shape of bottle, it will be understood that gauge bars 76, 78 and 80 are all in approximately the same vertical plane as the face of guide 72.

Referring to FIG. 4, let it be assumed for a moment that bottles are laid side by side on the two lowermost shelves 26, the remaining shelves being empty, and that the horizontally disposed bottle X is the uppermost one in column 60, the column also being empty above this point. Under this condition, bottle X keeps the adjacent gate 56 from swinging open, and bottles on the associated shelf 26 thus are prevented from rolling into column 60; similarly, the lowermost gate 56 blocks the path of bottles stored on the lowermost shelf 26, this gate being held shut by the bottle immediately below bottle X.

When bottle A now is withdrawn from the vending station through port 22b, as will be described in more detail hereafter, bottle A' can advance into the vending station, whereupon all of the bottles following it also will move downwardly one position under the influence of gravity. Accordingly, bottle X no longer blocks the path of the uppermost gate 56 shown in FIG. 4 and, under the influence of the force exerted on it by the bottles on the associated shelf 26, this gate swings open (see dotted lines) to admit bottles from the shelf into column 60. A rectangular cut-out aperture 62e for each gate is provided in panel 62 to permit this movement of the gate. In its dotted position, gate 56 blocks off the portion of column 60 above the gate, but the supply of bottles on the uppermost shelf shown in FIG. 4 serves to keep the portion of the column below this gate full until the number of additional bottles withdrawn from the machine through port 22b has been sufficient to empty said shelf.

Throughout this time, the lowermost gate 56 is held closed by the bottles descending in column 60 from the shelf above. However, when the level of bottles in the column at last drops below the bottom of this gate, it, too, can swing open to permit bottles from the lowermost shelf 26 to enter column 60 in the same fashion as just described in connection with the shelf immediately above. Thus, with each subsequent vending operation, these bottles enter column 60 one after another and advance downwardly in the passageway until the last bottle to leave the lowermost shelf has finally been withdrawn from vending station A through port 22b, exhausting the supply of bottles available at this port.

To facilitate replenishing the supply, the front panel 22 of the machine is provided with a vertically elongated opening 22d which registers with the bottle column 60, it being understood that this, as well as the storage shelves extending laterally from the vending machine proper, are accessible to service personnel for loading purposes. The loading procedure is as follows:

Bottles are inserted one after another into column 60, each being held horizontally by the neck and advanced in a generally endwise direction through the upper portion of opening 22d until its base engages guide 72; in turn, each of the first six thus inserted into column 60 is lowered by hand onto chute 30 and released so it can roll down the chute under the influence of gravity. Traveling the path outlined earlier, the first bottle reaches position A, the second reaches position A' and the next four fill the portion of the bottle passageway below the upright column 60. Thereafter, bottles are stacked horizontally one upon another in the column until it is full, the top bottle then being immediately below an inclined flange 62d (FIGS. 1 and 3) which projects laterally from the upper extremity of side wall 62. Next, bottles are laid side by side on the top shelf 26 until it is filled, after which the remaining shelves 26 also are filled in similar fashion.

In the course of the ensuing vending operations, it will be understood that each time a bottle A is withdrawn through 22b the next bottle, A', will depress the stop 48a and, on rolling downwardly into the vending station behind port 22b, cause the stop again to be elevated so as to block the path of the bottle following it. With each such operation, all of the bottles in column 60 descend one position, permitting one more botle to roll off of the uppermost shelf 26 into the column. Only when the top shelf has been emptied and there are no more bottles in column 60 above the level of the second shelf 26 can the bottles on the latter shelf push open the gate 56 at the lower end thereof and begin to feed into the column. Thus, the order in which the feeding of bottles from shelves 26 proceeds begins with those on the top shelf and ends with those on the bottom shelf of the group, each shelf 26 in turn being entirely cleared of bottles before any can be fed into column 60 from the next lower shelf 26.

*Bottle feeding and lockout arrangement for lower shelves 27*

While all of the bottles which are to be vended through port 22b should be of the same size and in practice will ordinarily contain the same brand of beverage, different brands in different sized bottles can, if desired, be vended through each of the ports 22a. The manner in which the platform or tray 38 behind each of the latter ports can be adjusted to suit the bottle diameter has already been described. In order to insure that bottles rolling onto each tray from the associated shelf 27 will be properly positioned axially, a gauge bar 82 (against which the base of the bottles abut when they are laid on the shelf) is provided as shown in FIGS. 11 and 14.

Gauge bar 82 is essentially like bar 76, described hereinbefore, as regards construction, mounting arrangement and adjustability. It has a base or flange 82a adapted to rest on the shelf and at its ends there are downwardly projecting lugs 82b, one of which is received in a selected one of the positioning holes 38f of the tray 38 while the other is received in a corresponding hole in the shelf bracket (not shown) which supports the upper end of shelf 27. In use, the gauge bar 82 for each shelf is positioned according to the length of the bottles to be handled on that shelf, so that the small capped end of said bottles will be spaced only a small distance behind front panel 22 when each in turn reaches the vending station at the lower end of said shelf. Also, each shelf 27 is bodily adjustable forwardly or rearwardly on its supports in the same fashion as has been explained in connection with shelf 26, whereby the ledge 27a will properly support the tapered neck portion of the bottles being handled; notches or slots 27b are provided to lock the shelf in its forward or rearward position as has been described.

The position which a bottle occupies when it is in the vending station behind any discharge port 22a is shown by dotted lines in FIGS. 4, 5, 14 and 16. Above its reduced neck portion there is a gate 84 having a roller 85 in a position to be engaged by the bottle when same is pulled through the associated port 22a. The gate is swingably pivoted on a hinge pin 86, one end of the pin being carried by the side panel 20 of the machine, while the opposite end is carried by a bracket 88 spot welded or otherwise suitably secured to the front panel 22.

Figure 8:
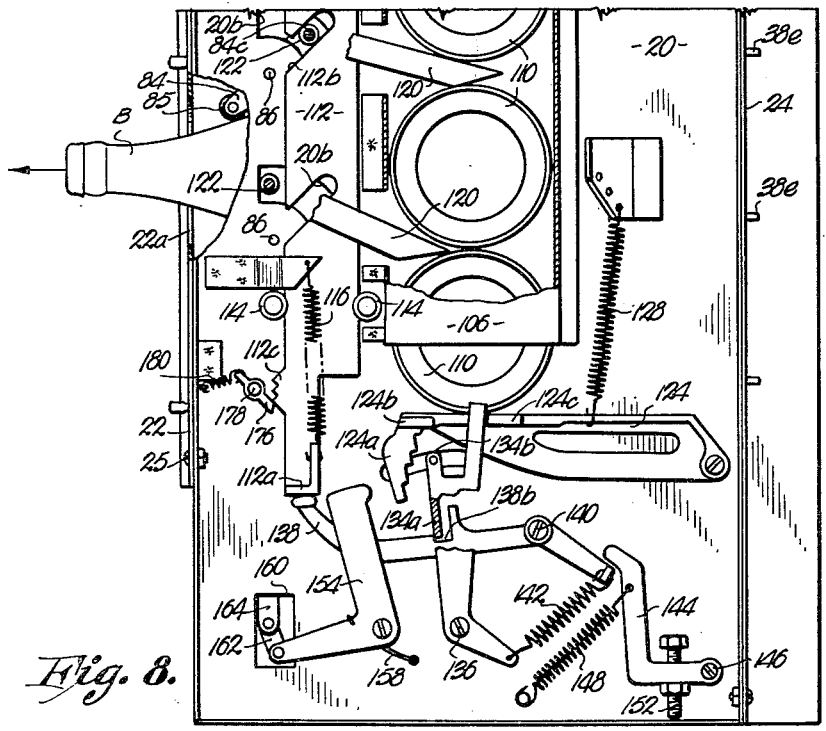
Figure 9:
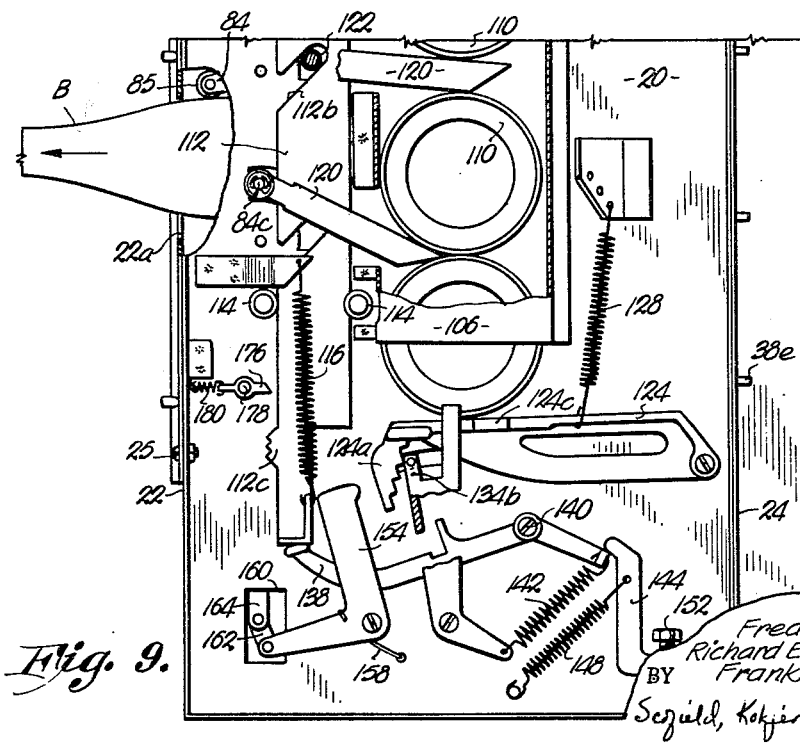

Normally locked in the position illustrated in FIGS. 4 and 5 to prevent withdrawal of the associated bottle, gate 84 is temporarily unlocked at the time of a vending operation as will be explained hereinafter and, when the bottle is withdrawn, it serves to tilt the gate clockwise as shown in FIGS. 8 and 9.

Referring to FIGS. 11 and 14, each gate 84 has a rearwardly extending integral crank arm 84a at one side thereof and an upwardly extending integral crank arm 84b at the opposite side. A generally horizontal lockout bar 90 has its forward end loosely pivoted to arm 84a at 91; the rear end of the bar is similarly pivoted at 92 to a pair of links 94, these being swingably mounted on a trunnion pin 96 which is rigidly and permanently secured to one side of the channel shaped portion 24d of the rear panel of the machine. Thus, as may be appreciated from FIG. 11, when a bottle, in the course of being withdrawn, engages roller 85 of the gate and causes the gate to turn clockwise about its pivot 86, the resultant downward movement of crank arm 84a causes bar 90 to swing downwardly and forwardly while remaining generally horizontal. As a result, the bar enters the space between the bottle being withdrawn and the one immediately beside it (see FIG. 16) restraining the latter from advancing into the vending station until gate 84 has returned to its normal position following complete withdrawal of the bottle being vended.

This makes it impossible for a customer to obtain a second bottle by manually holding gate 84 "open" (i.e., in the position illustrated in FIG. 9) after a first bottle has been withdrawn. Stated differently, for a bottle held back by the lock-out bar 90 to enter the vending station and thus become vendable, it is essential that gate 84 return all, or practically all, of the way to "closed" position (i.e., the position illustrated in FIG. 5) and, as will be seen shortly, any such return of the gate after it has once been opened makes reopening of the gate impossible until such time as another vending fee is paid.

*Bottle lockout mechanism for upper vending station*

The gate 84 behind the uppermost vending port 22b is identical to those employed for the lower ports 22a. Like the latter, it has a rearwardly extending crank arm 84a on one side, an upwardly extending crank arm 84b on the other side and a bottle engaging roller 85 spaced below its pivot pin 86. This gate normally is locked in vertical position (FIG. 11) to prevent unauthorized withdrawal of a bottle from the associated vending station but, when temporarily released, it is pivoted clockwise as the bottle is pulled through port 22b, all as explained earlier in connection with the gates associated with the other vending stations.

The position which a bottle occupies when it is in the uppermost vending station is illustrated by dotted lines in FIGS. 4 and 13. In addition to the aforementioned gate 84 located over the neck of this bottle, there is a further gate 97 positioned over the main body portion. One edge of gate 97 is pivoted close to side panel 20, on a hinge pin 98 whose ends are received in a bracket 99 which is bolted or otherwise suitably secured to the side panel. The opposite edge of the gate is bent to modified V-shaped transverse cross section (FIG. 4) forming an upstanding marginal flange 97a; this has an integral forwardly and upwardly extending arm 97b which is operatively connected to the rearwardly extending crank arm 84a by means of an L-shaped link 100, the ends of the latter being loosely hinged to the respective arms.

Referring to FIG. 11, it will be clear that link 100 is drawn downwardly by arm 84a of the associated gate 84 whenever the latter is turned clockwise about its pivot 86 in the course of withdrawing a bottle through port 22b from the uppermost vending station. This swings gate 97 about its pivot 98 from the position shown in FIG. 4 to that shown in FIG. 4a. In other words, when bottle A has been pulled far enough through port 22b to clear the treadle 48, bottle A' depresses stop 48a and rolls a short distance down chute 46 and into engagement with the barrier flange 97a on gate 97 as illustrated in FIG. 4a. This prevents bottle A' from advancing into the vending station behind port 22b until bottle A has cleared gate 84 and the latter has swung back to "closed" position, elevating gate 97.

The barrier flange 97a of gate 97 thus serves the same basic purpose as the lockout bars 90 associated with the other vending stations, that is to say it prevents a customer from withdrawing a second bottle A' through port 22b by manually holding the associated gate 84 open following withdrawal of a first bottle A. It differs from the lockout bars, however, in that the thrust exerted on it by a bottle such as A' (FIG. 4a), which thrust may be considerable in view of the weight of the bottles stacked in column 60, is transferred directly to the side wall 20 of the machine, rather than being taken by a more lightly constructed lockout bar such as 90.

Also, when bottle A has cleared the gate 84, there is no possibility of this gate remaining open due to a bind between bottle A' and the barrier flange 97a; instead, due to the inclined aspect of the flange when it is in its FIG. 4a, position, it actually is cammed upwardly by bottle A' as soon as gate 84 has been cleared by bottle A, thus assisting in the return of gate 84 to closed position. Closing of this particular gate also is assisted by a coiled tension spring 102 (FIG. 5). As will be noted from the latter figure, spring 102 has one end hooked to a lug 20d on the side panel 20, the opposite end being hooked to an apertured member 104 received on the pin 84c extending laterally from the uppermost end of arm 84b of the gate.

*Gate lockout mechanism*

It will be convenient now to explain the locking and interlocking mechanism which controls all of the gates 84, reference being made first to FIG. 5. On the side panel 20 of the machine, there is a shallow channel-shaped member 106 having marginal flanges 106a and 106b which are spot welded or otherwise suitably secured to the side panel to form a vertical passageway 108 loosely confining rings 110 against substantial horizontal movement in any direction.

Beside this channel or passageway, an upright flat bar 112 is mounted on the side panel by means of grooved rollers 114 engaging its opposite edges so that the bar is movable in a vertical direction. A coiled tension spring 116 having one end hooked to an integral L-shaped flange 112a at the lower end of the bar and having its other end hooked to a bracket 117 which is spot welded to the side panel 20 urges bar 112 upwardly so that its upper end normally bears against a stop 118 bolted to the side panel.

The upstanding arm 84b of each bottle gate 84 has an integral laterally projecting pin 84c which extends through the side panel 20. The apertured end of a spreader finger 120 is received on this pin and is retained in place by a conventional C-shaped spring clip 121 fitting in an annular groove near the outer extremity of the pin.

All of the spreader fingers 120 overlie bar 112. Each extends through a cutout aperture 106c in the side wall of channel 106 and has a tapered or wedge shaped lower end positioned between an adjacent pair of the rings 110 in the manner illustrated in FIG. 5.

The upper end of each spreader finger 120 is spaced laterally from its associated crank arm 84b, and, between the two, pin 84c is encircled by a roller collar 122 which is free to turn on the pin. In normal position (FIG. 5) all of these collars are close to the left-hand vertical edge of bar 112 but each is positioned adjacent to the entrance or mouth of a diagonal camming slot 112b in the bar. Underneath the bar, the side panel 20 of the machine is provided with arcuate slots 20b (best seen in FIG. 3) these being the slots in which collars 122 are located. Each of the arcuate slots is concentric with one of the hinge pins 86 to accommodate the travel of a collar or roller 122 upon tilting of the associated gate 84.

Referring further to FIG. 5, the lowermost one of the rings 110 rests on the flanged upper edge of a ring support lever 124 which is hinged to swing on a pivot bolt 126 carried by the side panel 20 of the machine. A coiled tension spring 128 having one end hooked to this lever and the other end hooked to an apertured bracket 129 which is spot welded to the side panel causes lever 124 to exert an upward thrust on the stacked rings 110, so that the uppermost one of the rings normally is maintained in engagement with the stop 130. Conveniently, this stop can be a flanged semi-circular plate secured to panel 20 by means of bolts 132 extending through vertically elongated holes 130a in the plate to permit upward or downward adjustment of the stop merely by loosening bolts 132. Bracket 129 is provided with a series of apertures 129a for receiving the upper end of spring 128, the tension of the spring depending, of course, on which aperture is used.

Associated with the ring-supporting lever 124 is a detent member 134 rockably mounted on a pivot bolt 136 carried by the side panel 20, and a detent latch 138 similarly mounted on a pivot bolt 140. Both of the latter members are spring biased, detent 134 being urged in a counterclockwise direction and latch 138 in a clockwise direction with reference to their respective pivots; although a separate spring can be employed for biasing each member, it is preferred to accomplish this by means of a single tension spring 142 connected between the two members as shown in FIG. 5.

On the inner face of detent 134 there is an integral rib or lug 134a against the lower extremity of which the latch 138 bears under the influence of spring 142. The upper extremity of this rib comprises a tongue or stop 134b which, under the influence of said spring, bears on the lower extremity of a toothed segment 124a extending downwardly from lever 124 at the free end thereof. Accordingly members 134 and 138 normally occupy the position shown in FIG. 5. When in this position, a shoulder 134d on the detent is disposed under a laterally projecting lug 124b on the ring supporting lever 124, preventing substantial downward movement of the free end of the latter.

Tongue 134b of detent 134 carries an integral pin 134c which projects rearwardly through an elongated slot 20c in the side panel. When the parts are positioned as shown in FIG. 5, this pin bears on the operating lever 143a of a switch 143 as best seen in FIG. 3, maintaining the switch closed. The FIG. 3 position of pin 134c is the limit of its travel in a right-hand direction, but as will be seen presently it can be displaced toward the left by different amounts at different times. Switch 143 conveniently is of the type whose contacts are open at all times except when the pin is in its FIG. 3 position; its function will be explained hereinafter.

Referring again to FIG. 5, panel 20 has a generally L-shaped booster lever 144 pivotally mounted thereon at 146. A coiled tension spring 148 connected between this lever and a fixed pin 149 on the panel urges the lever counterclockwise. Under the influence of this spring, the lower end of a stop 150 carried by the lever bears against flange 20b at the bottom of panel 20 whereby lever 144 normally occupies the position shown in FIG. 5. Stop 150 is a bolt screw-threadedly received in lever 144; by turning the bolt in one direction or the other, the normal or "rest" position of the lever can be adjusted upwardly or downwardly, the bolt having a lock nut 152 thereon to hold it in adjusted position. Preferably the adjustment is such that the free end 144a of the booster lever is just in touching engagement with the end of latch member 138 as shown, without exerting any substantial force thereon.

Panel 20 also has a generally L-shaped cocking lever 154 pivotally mounted thereon at 156, this lever being biased counterclockwise by means of spring 158 whereby it normally occupies the position illustrated in FIG. 5. The lower end of the lever has an integral pin 154a extending through a vertically elongated slot 160 in the panel, and this is connected by means of a link 162 to the armature 164 of a solenoid 165 which is mounted on the opposite side of the panel. Energization of the solenoid is effective, of course, to draw armature 164 upwardly and turn lever 154 clockwise against the tension of spring 158.

The electrical circuit for the machine, so far as is pertinent here, is shown schematically in FIG. 19. It employs a conventional coin collect mechanism 170 of the type into which a customer can insert the coin or coins necessary to start a vending cycle. The coin collector has a magnet 172 which, if energized, permits the deposited fee to be retained by the collecting mechanism, in which case the normally open "vend" switch 174 is closed briefly by the coin deposit; however, if magnet 172 is deenergized, the mechanism rejects the deposit and returns the same to the customer without any actuation of switch 174. Structural details of the coin collect mechanism by which these functions are carried out are not shown in the drawings inasmuch as such devices are well known to those versed in the art and do not, per se, form a part of the present invention.

*Operation during vending cycle*

For the purpose of desciribing the operation of the machine during a vending cycle, let it be assumed that it is in stand-by condition, with all parts positioned as indicated in FIG. 5. Under this condition, switch 143 is closed as previously mentioned, and solenoid 172 of the coin collector (FIG. 19) therefore is energized. If a customer now deposits the proper coin or coins, the resultant closing of switch 174 in the coin collector completes an obvious circuit for solenoid 165 so that the latter is energized.

The energization of solenoid 165 turns the cocking lever 154 clockwise as indicated by the arrow in FIG. 6. The rounded nose 154b thus strikes the edge of detent 134 pushing the detent to the right until its rib 134a engages the upstanding stop 138a on the latching lever 138, as shown. In this position, rib 134a registers with a notch 138b in the latching lever so, under the influence of spring 142, this lever now turns clockwise a small amount to bring the base of the notch into engagement with the bottom of rib 134a.

As mentioned earlier, the "vend" switch 174 in the coin collect mechanism 170 remains closed for only a very brief interval and when it now reopens this interrupts the circuit for solenoid 165. The deenergization of the solenoid therefore permits lever 154 to return to its original position under the influence of spring 158, as illustrated in FIG. 7. As soon as relieved of the force previously exerted on it by lever 154, detent 134 also shifts slightly to the left under the influence of spring 143; however, it cannot return to its original position due to rib 134a being in notch 138b.

The machine has now been cocked or conditioned for vending, that is to say a customer may now pull a bottle from any vending station through the port 22a or 22b associated with that station. When this is done (see FIG. 8) the bottle engages roller 85 and cams gate 84 clockwise about its pivot 86. Roller 122 on the upstanding arm 84b of the gate thus enters the adjacent slot 112b of the lockout bar 112 and, as the roller advances in a clockwise direction, it exerts a camming force on the lower edge of the diagonal slot, causing bar 112 to move downwardly against the tension of spring 116. At the same time, the pin 84c on which said roller is mounted serves to advance the associated spreader finger 120 toward the right, forcing its tapered end between two of the rings 110. Since the rings above this point cannot move upwardly due to the stop 130 (FIG. 5), those below the spreader bar in question are pushed downwardly, causing the ring support lever 124 also to be pushed downwardly against the tension of spring 128.

With a given bottle B pulled out to the position shown in FIG. 8, let it be assumed for a moment the customer changes his mind and decides that he wants to withdraw a different bottle from its resting place in another one of the vending stations of the machine. This cannot be done while bottle B remains partially withdrawn, for the reason that bar 112 now blocks the path of all rollers 122 except the one already displaced; all of the gates 84 except that already tilted by the bottle B are, in other words, effectively locked in vertical or "closed" position, preventing the withdrawal of another bottle. However, if bottle B is first pushed back into its vending station, spring 116 will return bar 112 to its FIG. 5 position and, in doing so, will swing the tilted gate 84 back to its closed position by camming the associated roller 122 counterclockwise.

Since all other parts of the apparatus still are positioned as shown in FIG. 7, the customer can make a fresh selection and pull out any desired bottle resting in a vending station, whether it is the same or a different one than that partially withdrawn on the first occasion.

With the parts in their FIG. 7 position, however, suppose the customer endeavors to withdraw two bottles simultaneously from different vending stations, with a view to obtaining delivery of a plurality of bottles although only a single fee has been paid. As the two bottles are withdrawn, each will turn its associated gate 84 clockwise and the rollers 122 carried by the gates will enter their associated slots 112d moving bar 112 downwardly as described hereinbefore. Also, the spreader fingers 120 for both gates will advance between rings 110 at the same time, with the result that by the time both bottles have been pulled out approximately as far as indicated in FIG. 8 the lowermost ring 110 will have pushed lever 124 down far enough to bring lug 124b into engagement with the upper end of the stop 134b on the detent 134. Accordingly, neither of the two bottles can be pulled out any farther, and the customer's attempt to "beat the machine" is defeated. Even so he is not penalized, for he can push both bottles back into their respective vending stations, which serves to restore the parts to their FIG. 7 position, after which there can be a legitimate withdrawal of any desired single bottle, such as B, as described hereinbefore.

The action of the machine after it has been cocked (FIG. 7) and up to the time a given bottle is withdrawn to the point illustrated in FIG. 8 thus may be summarized as follows: Since at the outset each roller 122 registers with the entrance of one of the diagonal slots 112b in the bar 112, any desired gate can be opened as far as shown in FIG. 8, giving the customer complete freedom of choice as to which bottle is to be withdrawn from its associated vending station. In the course of withdrawing any one of them, bar 112 is displaced downwardly due to the tilting of one gate, moving the notches 112b out of register with the rollers 122 of the remaining gates so that the latter are locked in closed position. Any attempt to withdraw two or more bottles prior to such locking is defeated due to the fact that stop 134b limits the downward displacement of lever 124 to an amount too small to allow adequate spreading of rings 110 by more than one finger 120 at a time. However, until such time as a bottle is withdrawn farther than indicated in FIG. 8, the customer, by pushing the bottle back into the vending station is completely free to change his mind and make another selection.

In the position of the apparatus illustrated in FIG. 8, it will be noted that the L-shaped lug or flange 112a at the lower extremity of bar 112 has moved into engagement with the free end of the latching lever 138. As bottle B continues to be pulled in the direction of the arrow, the additional tilting of the associated gate 84 does two things: First, by advancing spreader 120 farther between the rings 10 it causes the latter to continue to displace lever 124 downwardly. Second, the flange 112a on the lockout bar 112 depresses the free end of latch 138 sufficiently to withdraw notch 138b from rib 134a. As soon as the latter rib is free of the notch, spring 142 causes detent 134 to turn counterclockwise on pivot 136, bringing the side of stop 134b into engagement with the uppermost long tooth of the toothed sector 124a on lever 124, as best seen in FIG. 10.

As the free end of lever 124 continues to move downwardly under the influence of rings 110 (due to the further spreading of two of the rings by the finger 120 as withdrawal of the bottle B proceeds) stop 134c slides on the face of the aforementioned long tooth of segment 124a, as will be understood from FIGS. 9 and 10. With the thickest portion of bottle B passing under roller 85 of the associated gate 84, the position of the parts is substantially as shown in FIG. 9. Under the influence of roller 122, bar 112 now has been cammed downwardly to the lowermost limit of its travel, and its toothed segment 112c thus is clear of pawl 176. In this position, the left-hand of lever 138 is depressed below its FIG. 5 position, causing the right-hand end to raise booster lever 144 a short distance against the tension of spring 148, as shown.

Spring 148 is very substantially stronger than springs 116 and 142. Accordingly, when the base of bottle B clears gate 84 the upward pull of spring 116 which tends to return bar 112 to its FIG. 5 position is initially augmented by a strong upward thrust imposed on the lower end of the bar by spring 148 acting through levers 144 and 138, as well as by the more lightly tensioned spring 142 acting on lever 138. During the resultant upward travel of bar 112—which takes place quickly due to the initial impetus given the bar mainly by spring 148—slot 112b cams roller 122 counterclockwise, causing spreader 120 to be withdrawn from between rings 110 while gate 84 concurrently is returned toward its normal or "closed" position. This withdrawal of spreader 120 is assisted by rings 110 themselves which, under the influence of spring 128, exert a "squeezing" action on the tapered end of the spreader, forcing it back toward normal position while the rings return to rim-to-rim abutting relation. This, of course, is accompanied by a lifting of lever 124 by spring 128, and as each tooth of the sector 124a moves upwardly past the end of stop 134b, the detent 134 shifts slightly to the left (i.e., counterclockwise) under the influence of spring 142, with the result that this and all other parts are quickly restored to their FIG. 5 position following withdrawal of a bottle such as B from the machine. The toothed segment 112c tilts pawl 176 counterclockwise very briefly during the interval that the segment is traveling upwardly past the pawl, but unless an attempt is made to defeat the mechanism during this return movement the pawl is without effect.

Let it be assumed, however, that as the base of bottle B (FIG. 9) is drawn clear of gate 84, the customer manages in some fashion to hold the gate open by hand. He cannot, of course, withdraw another bottle from the same vending station, for the next bottle cannot enter the station until the gate has closed. Neither can he withdraw another bottle from a different vending station, for opening of another gate is blocked by the lockout bar 112. If he slowly lowers the gate which is being held open by hand, with a view to getting a second bottle either from the same or a different vending station, this will gradually raise bar 112 and will also gradually raise lever 124 as the spreader 120 is withdrawn from between rings 110. Accordingly stop 134b is caused to engage the toothed sector 124a below the long uppermost tooth thereof, while pawl 176 engages the toothed segment 112c. Both of these things occur before the point is reached where another bottle can be withdrawn and each, by blocking subsequent retrograde movement of the respective parts, is effective to defeat the attempt to obtain another bottle without paying an additional vending fee.

As explained earlier, it is not until gate 84 has returned to "closed" position following the vending cycle such as described above that another bottle can roll into the vacant vending station to replace the one withdrawn from the machine. By that time, shoulder 134d is, of course, once more under the laterally projecting lug 124b on lever 124 and the machine once more is in stand-by condition. In this condition, there can be no substantial downward movement of the ring 110 resting on lever 124 because this is blocked by shoulder 134d; consequently any attempt to withdraw another bottle without first depositing an additional fee will be futile since there can be no spreading of any pair of rings 110 in the fashion that is necessary to permit one of the gates 84 to open.

However, when the proper vending fee once more is deposited in the coin collect mechanism 170, this will again close switch 174 briefly, resulting in the temporary reenergization of solenoid 165 whereby the mechanism will again be cocked or conditioned for vending as has been described in connection with FIGS. 6 and 7. With respect to the cocking operation, it may be noted that the clockwise movement of lever 154 from its FIG. 5 position upon energization of solenoid 165 brings the broad upper end of this lever underneath segment 124a of lever 124 before lever 154 engages detent 134. Shifting of the detent to the right and the resulting displacement of shoulder 134d from its normal position under lug 124b of lever 124 therefore begins only after the broad upper end of lever 154 is in a position which blocks downward movement of lever 124, a condition which continues to prevail throughout the interval that lever 154 is moving clockwise under the influence of solenoid 165.

Moreover, at the conclusion of the foregoing movement shoulder 134d is disposed under the laterally projecting lug 124c (see FIG. 6) so that downward movement of lever 124 now is blocked both by shoulder 134d and the upper end of lever 154. Thus, it is not until solenoid 165 deenergizes and the parts assume their FIG. 7 position that lever 124 can move downwardly under the influence of rings 110; stated differently, only after the FIG. 7 position has been established can a spreader 120 be advanced a sufficient distance between a pair of rings 110 to permit one of the gates 84 to open and, until then, no bottle can be withdrawn from any vending station.

On the other hand it may be noted that as soon as pawl 134 leaves its FIG. 5 position and shifts clockwise incident to the cocking operation described hereinbefore, pin 134c moves away from the operating lever 143a of switch 143, so that this switch no longer is held closed. The switch thereafter remains open throughout the complete vending cycle and is reclosed only when pin 134c reengages lever 143a in the course of pawl 134 returning to its FIG. 5 (i.e., stand-by) position following withdrawal of a bottle from the machine. In the meantime, coin solenoid 172 in the collecting mechanism 170 is deenergized, because its circuit is open at contact 143 (FIG. 19). The customer who deposits two vending fees in quick succession thinking he will then withdraw two bottles thus is protected against loss of the second fee, for if any coins are deposited between the time the machine is initially cocked for vending and the time that a bottle has been withdrawn, they will not be accepted but instead will be returned to the customer. Moreover, in the event that another vending fee is deposited while the customer is in the process of pulling out a first bottle (FIGS. 8 and 9) this automatic return of the coins insures that they will not reclose contact 174, from which it follows that solenoid 165 cannot turn lever 154 clockwise while sector 124a of lever 124 is in a position which might otherwise subject it to injury through being struck by lever 154.

A further feature of importance may be understood by referring again briefly to FIG. 8. In the course of withdrawing a bottle such as B, it is necessary that the pull which the customer exerts on the bottle be sufficient to overcome the tension of springs 116 and 128. However, this tension can be sufficiently light that the two springs offer comparatively little resistance to the withdrawal of the bottle. Some additional resistance is offered by spring 142 after bar 112 begins pushing the left-hand end of lever 138 downwardly, but this spring, too, can be quite light in tension. Going one step further, when the withdrawal reaches the point where the right-hand end of lever 138 engages booster lever 144 and begins to lift the latter, the additional tension of spring 148 (which is quite substantial) must, of course, also be overcome. However, by the time this point is reached, gate 84 is tilted nearly to the position shown in FIG. 9 whereby the angular aspect of the gate with reference to bar 112 gives sufficiently greater mechanical advantage than at the outset to permit overcoming the additional tension of spring 148 without any substantial increase in the pull exerted on bottle B. By thus graduating the spring resistance so that it is smallest when the mechanical advantage is smallest, and vice versa, the customer-effort required to pull out a bottle is made much smaller than would otherwise be the case—and without sacrificing the speed with which the parts will be returned to their stand-by position (FIG. 5) after the bottle has cleared the gate 84.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as various possible modifications of the invention may be made without departing from the scope thereof, it is to be understood that all matter herein set forth or shown in the accompanying drawings is to be interpreted as illustrative and not in a limiting sense.

Having thus described our invention, we claim:

1. In a selective vending machine, a plurality of article storage magazines, a different vending station for receiving articles from each magazine, each station having a passageway via which articles can be withdrawn from that station, a gate for each passageway, mechanism common to the gates for all of said passageways normally locking all of same in closed position thereby to prevent withdrawal of articles from any station, coin controlled means for unlocking said mechanism thereby to permit the opening of any gate, said mechanism having means controlled by the opening of any gate for preventing the concurrent opening of any other gate, the article storage magazine for one station comprising an upright passageway communicating at its lower end with said one station, a plurality of superposed article storage shelves, each of said shelves being inclined for communicating at its lower end with said upright passageway to feed articles thereinto, a pair of vertical panels normal to one another defining two sides of said upright passageway, means adjustably supporting each of said panels for horizontal movement in a direction normal to its own plane thereby to adjust the effective horizontal cross section of said upright passageway, said supporting means for one of the panels comprising a stationary frame having a pair of vertically spaced generally horizontal ledges, and a pair of brackets on said one panel having notched lower edges received on the respective ledges.

2. In a selective vending machine, a frame having an upright side wall, a plurality of vertically spaced generally parallel article feeding chutes inclined downwardly toward said wall and each terminating in a vending station adjacent to said wall, said frame having a front wall containing vertically spaced ports registering with the respective vending stations to facilitate the withdrawal of articles therefrom, a gate for each port, mechanism common to said gates normally locking all of same in closed position thereby to prevent withdrawal of articles from any station, means for unlocking said mechanism thereby to permit the opening of any gate, said mechanism having means controlled by the opening of any gate for preventing the concurrent opening of any other gate, said frame having a fixed barrier spaced above one of said chutes in a position such that articles advancing down said chute must pass under said barrier to reach that chute's vending station, said barrier being vertically adjustable on said frame to adjust the distance of said fixed barrier above said one chute, a second barrier located below said fixed barrier and movably mounted on said one chute for movement between a lower position substantially flush with said chute and an upper position elevated above the level of the chute, the vertical space between said two barriers when said second barrier is in elevated position being less than the vertical dimension of articles stored on said one chute, and means coupled with said second barrier for maintaining same in elevated position whenever an article is in the vending station at the lower end of said one chute.

3. In a vending machine as in claim 2, a third barrier intermediate said first barrier and the vending station for said one chute, said third barrier being movably mounted on said frame for movement between an upper position and a lower position, means controlled by the gate for said station for shifting said third barrier to its upper position whenever the gate is closed and to its lower position whenever the gate is open, said third barrier in its lower position being in the path of articles advancing down said one chute toward the vending station at the terminus thereof and in its upper position being clear of said path.

4. In a selective vending machine, a frame having an upright side wall, a plurality of vertically spaced generally parallel article feeding chutes inclined downwardly toward said wall and each terminating in a vending station adjacent to said wall, said frame having a front wall containing vertically spaced ports registering with the respective vending stations to facilitate the withdrawal of articles therefrom, a gate for each port, mechanism common to said gates normally locking all of same in closed position thereby to prevent withdrawal of articles from any station, means for unlocking said mechanism thereby to permit the opening of any gate, said mechanism having means controlled by the opening of any gate for preventing the concurrent opening of any other gate, a barrier generally parallel to said side wall and movably mounted on said frame for movement between an upper position and a lower position, mechanism coupling said barrier to one of said gates for shifting the barrier to its upper position whenever the gate is closed, and to its lower position whenever the gate is open, said barrier in its lower position being in the path of articles advancing down one of said chutes toward the vending station at the terminus thereof and in its upper position being clear of said path, said barrier comprising an edge portion of a member hingedly mounted on said side wall, and said member comprising a strut between said barrier and side wall for transferring to said side wall the thrust exerted on the barrier, when lowered, by articles on said one chute.

5. A vending machine as in claim 4 wherein said barrier, when lowered, is in a plane so inclined relative to vertical that articles on said one chute bearing on the barrier exert an upward camming thrust thereon.

6. In a selective vending machine, a plurality of vertically spaced vending stations each having an individual passageway via which articles can be removed from that station, each passageway having a gate, mechanism common to said gates normally locking all of same in closed poistion to prevent removal of articles from any station, coin controlled means for releasing said mechanism thereby to permit the opening of any gate, said mechanism having means controlled by the opening of any gate for preventing the concurrent opening of any other gate and, upon reclosing of the opened gate, relocking all of said gates in said closed position, said coin controlled means comprising collecting apparatus constructed and arranged to collect coins when all of said gates are locked in closed position, and means controlled by said mechanism for always preventing said collecting apparatus from collecting coins while said gates are unlocked.

7. In a selective vending machine, a plurality of vertically spaced vending stations each having an individual passageway via which articles can be removed from that station, each passageway having a gate, mechanism common to said gates normally locking all of same in closed position to prevent removal of articles from any station, coin controlled means for releasing said mechanism thereby to permit the opening of any gate, said mechanism having means controlled by the opening of any gate for preventing the concurrent opening of any other gate and, upon reclosing of the opened gate, relocking all of said gates in said closed position, a switch common to said gates and having a normal position, means controlled by said mechanism for operating said switch upon the release of said mechanism and restoring the switch to normal upon relocking of all of said gates in closed position, said coin controlled means comprising collecting apparatus having mechanism for at times rejecting coins, and means controlled by said switch for rendering said coin rejecting mechanism effective throughout the time that the switch is operated.

8. In a selective vending machine, a plurality of vertically spaced vending stations each having an individual passageway via which articles can be removed from that station, each passageway having a gate, mechanism common to said gates normally locking all of same in closed position to prevent removal of articles from any station, coin controlled means for releasing said mechanism thereby to permit the opening of any gate, said mechanism having means effective upon the opening of any gate to impose on said gate a restoring force urging the gate toward closed position, said last means comprising a biasing spring and means for preventing said spring from imposing any force on a gate which is less than half open, and said mechanism also having means controlled by the opening of any gate for preventing the concurrent opening of any other gate.

9. In a selective vending machine, a plurality of vertically spaced vending stations each having a swingable vending gate, a column of generally circular elements stacked one upon another, each of said gates being pivoted to turn on an axis substantially level with the top of one of said elements and carrying a thrust member normally spaced vertically from said axis but adapted to swing towards said column upon opening of the gate, a plurality of vertically spaced spreaders each hinged to one of said thrust members and having a tapered end supported by and between an adjacent pair of said stacked elements to spread same apart upon opening of the associated gate, the top and bottom elements of said column normally being a predetermined distance apart when all of said gates are closed, and means limiting the amount that said distance can be increased due to spreading of said elements.

10. In a machine as in claim 9, a vertically movable upright bar positioned beside said column so as to be in the path of a portion of each thrust member when same swings toward said column, said bar containing a plurality of vertically spaced slots normally registering with said portions of the respective thrust members to receive same upon such swinging movement, said portions and slots comprising a coupling for imposing vertical thrust on said bar upon said swinging movement of any member.

11. A machine as in claim 10 wherein each of said slots is oblique to the longitudinal axis of said bar.

12. A machine as in claim 10 having means effective whenever the vertical displacement of said bar from normal position exceeds a predetermined distance to thereupon impose a spring restoring force on said bar.

13. In a selective vending machine, a plurality of vertically spaced vending stations each having a swingable gate, a column of vertical movable elements stacked one upon another, means controlled by the opening of any gate for spreading an adjacent pair of said elements apart thereby to shift an end one of said elements, a pivotal lever coupled with said end element for movement therewith and having a ratchet segment at its free end, a pivotal detent shiftable laterally into and out of engagement with said ratchet segment, a pivotal latch having means to engage and hold said detent when same is shifted out of engagement with said segment, spring means biasing said latch toward detent-engaging position and biasing said detent toward segment-engaging position, coin operated means for shifting said detent out of said segment-engaging position, and means common to said gates for disengaging said latch from said detent upon opening of any gate.

14. A vending machine as in claim 13 wherein said spring biasing means comprises a single spring having its opposite ends connected to said detent and latch respectively.

15. A vending machine as in claim 13 having a spring biased booster mechanism for assisting the return of any opened gate to closed position, and means coupling said mechanism to a gate when the latter is opened, said last means including said pivotal latch.

16. In a vending machine having a plurality of gates movable between open and closed positions, a reciprocable member, mechanism common to said gates for moving said member in one direction upon the opening of any gate and in the opposite direction upon the closing thereof, a second member movable in a path transverse to the path of said first member, the respective ones of said members having cooperating detent and ratchet portions, a latch engaged with said second member to hold same in a position spaced from said first member whereby said portions are out of engagement, means controlled by the opening of any gate for disengaging said latch, spring means biasing said second member toward said first member thereby to engage said detent and ratchet portions of said members upon disengagement of said latch, said portions being constructed and arranged to prevent movement of said first member in said one direction when all of said gates are closed, thereby to prevent reopening of any gate, and coin controlled means for moving said second member against the tension of said spring out of engagement with said first member and into engagement with said latch.

17. In a selective vending machine, a frame having an upright side wall, a plurality of vertically spaced generally parallel article feeding chutes inclined downwardly toward said wall and each terminating in a vending station adjacent to said wall, said frame having a front wall containing vertically spaced ports registering with the respective vending stations to facilitate the withdrawal of articles therefrom, a gate for each port, mechanism normally locking said gates closed to prevent withdrawal of articles from any station, means for unlocking said mechanism thereby to permit the opening of a gate, said frame having a fixed barrier spaced above one of said chutes in a position such that articles advancing down said chute must pass under said barrier to reach that chute's vending station, said one chute having member rockably mounted thereon, said member having on one side of its rock-axis a treadle portion on which an article in that chute's vending station is adapted to rest, and said rockable member having on the other side of said axis an integral portion extending upwardly at an angle to said treadle portion and forming a movable barrier positioned below said fixed barrier, the vertical space between said two barriers normally being less than the vertical dimension of articles stored on said one chute whereby articles can advance to that chute's vending station only by depressing said movable barrier and elevating said treadle, and means limiting the distance said treadle can be elevated when an article is resting thereon, said last means comprising a stop fixedly mounted on said frame in a position to be engaged by the top of an article resting on the treadle.

18. A vending machine as in claim 17, wherein said stop is vertically adjustable on said frame.

19. A vending machine as in claim 17, wherein said fixed barrier is releasably mounted on said frame for vertical adjustment relative thereto.

20. In a selective vending machine, a frame having an upright side wall, a plurality of vertically spaced generally parallel article feeding chutes inclined downwardly toward said wall and each terminating in a vending station adjacent to said wall, said frame having a front wall containing vertically spaced ports registering with the respective vending stations to facilitate the withdrawal of articles therefrom, a gate for each port, mechanism common to said gates normally locking all of same in closed position thereby to prevent withdrawal of articles from any station, means for unlocking said mechanism thereby to permit the opening of any gate, said mechanism having means controlled by the opening of any gate for preventing the concurrent opening of any other gate, at least one of said chutes having a member rockably mounted thereon to rock about an axis parallel to said side wall, said member having on one side of said axis a treadle portion on which an article in that chute's vending station is adapted to rest, said member having on the other side of said axis a portion extending upwardly at an angle to said treadle portion and forming a barrier to normally prevent articles from advancing down said chute toward said station, and a member extending outwardly from said side wall over the vending station for said one chute to hold down an article resting on said treadle, said hold down member being vertically adjustable on said side wall.

References Cited in the file of this patent

UNITED STATES PATENTS

| | | |
|---|---|---|
| 2,300,956 | Mergens | Nov. 3, 1942 |
| 2,513,595 | Stewart | July 4, 1950 |
| 2,531,347 | Voigtritter | Nov. 21, 1950 |
| 2,570,516 | Bowman | Oct. 9, 1951 |
| 2,727,654 | Childers et al. | Dec. 20, 1955 |
| 2,875,922 | Hsu et al. | Mar. 3, 1959 |
| 2,898,001 | Johnson | Aug. 4, 1959 |
| 2,922,545 | Denzer | Jan. 26, 1960 |
| 3,029,980 | Sturrock et al. | Apr. 17, 1962 |